United States Patent [19]

Kingma

[11] Patent Number: 6,096,148

[45] Date of Patent: Aug. 1, 2000

[54] USE OF POLYMERS BASED ON ETHYLENE, (METH)ACRYLATES, AND (METH)ACRYLIC ACID FOR COATING OR SEALING PANES OF LAMINATED SAFETY GLASS

[75] Inventor: Arend Jouke Kingma, Ludwigshafen, Germany

[73] Assignee: BASF Aktiengesellschaft, Ludwigshafen, Germany

[21] Appl. No.: 09/011,065

[22] PCT Filed: Jul. 26, 1996

[86] PCT No.: PCT/EP96/03289

§ 371 Date: Feb. 10, 1998

§ 102(e) Date: Feb. 10, 1998

[87] PCT Pub. No.: WO97/06005

PCT Pub. Date: Feb. 20, 1997

[30] Foreign Application Priority Data

Aug. 10, 1995 [DE] Germany .......................... 195 29 445

[51] Int. Cl.$^7$ ........................................... B32B 31/00
[52] U.S. Cl. ........................................... 156/107; 156/109
[58] Field of Search ............................... 156/99, 108, 109

[56] References Cited

U.S. PATENT DOCUMENTS 4,130,667 12/1978 Smith .

5,908,675 6/1999 Marquardt et al. ....................... 428/34

FOREIGN PATENT DOCUMENTS

| 1 154 620 | 6/1969 | United Kingdom . |
| 1 195 593 | 6/1970 | United Kingdom . |
| 1 298 732 | 12/1972 | United Kingdom . |

OTHER PUBLICATIONS

Patent Abstract of Japan, vol. 009, No. 222 (C–302), Sep. 9, 1985, and JP A 60 086058 (Yokohama Gomu KK.), May 15, 1985.

*Primary Examiner*—Francis J Lorin
*Attorney, Agent, or Firm*—Oblon, Spivak, McClelland, Maier & Neustadt, P.C.

[57] ABSTRACT

The use of polymers of

A) from 30 to 90 wt % of ethylene,

B) from 0 to 10 wt % of other α-olefins containing 2 to 12 C-atoms which may also carry halide atoms, C) from 3 to 40 wt % of one or more acrylates or methacrylates, in which the ester radical consists of $C_1$–$C_{20}$ alkyl, $C_5$–$C_{18}$ cycloalkyl, or $C_7$–$C_{18}$ aralkyl, where the said ester radicals may also carry halide atoms, D) from 7 to 30 wt % of acrylic acid and/or methacrylic acid, and E) from 0 to 10 wt % of other copolymerizable monomer for coating or sealing panes of laminated safety glass.

8 Claims, No Drawings

USE OF POLYMERS BASED ON ETHYLENE, (METH)ACRYLATES, AND (METH)ACRYLIC ACID FOR COATING OR SEALING PANES OF LAMINATED SAFETY GLASS

BACKGROUND OF THE INVENTION

1. Field of the Invention

The present invention relates to the use of polymers based on ethylene, (meth)acrylates, and (meth)acrylic acid for coating or sealing panes of laminated safety glass. The invention also relates to aqueous emulsions of these polymers and also to a process for coating or sealing panes of laminated safety glass using these aqueous emulsions. The invention also relates to panes of laminated safety glass coated or sealed according to the invention.

2. Description of the Background

Panes of laminated safety glass, which are particularly significant for motorcars, are usually composed of two layers of silicate glass, between which a layer of plastics material is interposed. For this purpose other layers of optically effective materials may be used which filter out ultraviolet or infrared rays. The said layer of plastics material serves on the one hand to hold the two panes of silicate glass together, whilst on the other hand it is intended to hold the splinters together when there is breakage of the entire pane.

High demands are placed on the mechanical, thermal, and chemical resistance properties of this layer of plastics material. The polyvinylbutyral films usually still used today for this purpose satisfy these requirements to an inadequate extent. In particular, when moisture and aggressive contaminants from the air penetrate into this layer of plastics material this loses its colorless-transparent appearance and becomes turbid.

In the case of completely enclosed panes of laminated safety glass such as motor vehicle windscreens help is possible here by all-round sealing to a certain extent, but, for example, in the case of those motorcar side windows which allow such edge-sealing in very special circumstances only, hermetic sealing of the internal layer of plastics material has hitherto been very difficult to achieve.

Edge-sealing of motorcar side windows can only be carried out using a colorless-transparent seal, this being undetectable to a person viewing it. Commonly used colored, ie mostly dark to black sealing compositions, as used, eg, for motor vehicle windscreens, are unsuitable in such cases.

Is is thus an object of the present invention to provide a material which is suitable for coating panes of laminated safety glass and satisfies the necessary demands concerning mechanical, thermal, and chemical resistance. This material should also be suitable for colorless-transparent edge-sealing of such panes.

DE-A 2,136,076 (1) reveals copolymers of ethylene, vinyl acetate, 2-ethylhexyl acrylate, and methacrylic acid which are prepared by high-pressure polymerization. These copolymers are suitable for combining two panes of glass to produce vehicle windscreens. For this purpose, they are applied to the glass as molten film or as a solution.

U.S. Pat. No. 4,130,667 (2) describes copolymers of α-olefins such as ethylene and unsaturated carboxylic acids such as (meth)acrylic acid which may contain polymerized units of a third monomer component such as an unsaturated carboxylate, eg, 2-ethylhexyl (meth)acrylate. These copolymers are suitable for coating glass surfaces, eg, glass bottles.

The copolymer is rolled on to the glass surface in powder form and then heated in order to produce the protective coating described.

SUMMARY OF THE INVENTION

The present invention now relates to the use of polymers of

A) from 30 to 90 wt % of ethylene,

B) from 0 to 10 wt % of other α-olefins containing 2 to 12 C-atoms which may also carry halide atoms, C) from 3 to 40 wt % of one or more acrylates or methacrylates, in which the ester radical consists of $C_1$–$C_{20}$ alkyl, $C_5$–$C_{18}$ cycloalkyl, or $C_7$–$C_{18}$ aralkyl, where the said ester radicals may also carry halide atoms, D) from 7 to 30 wt % of acrylic acid and/or methacrylic acid, and E) from 0 to 10 wt % of other copolymerizable monomer for coating or sealing panes of laminated safety glass.

DETAILED DESCRIPTION OF THE INVENTION

Suitable components B) to be used in addition to ethylene as component A) are other α-olefins containing vinylidene groupings or in particular vinyl groupings having 2 to 12, in particular 2 to 9 C atoms which may also carry halide atoms such as chlorine, bromine or, in particular, fluorine atoms. Examples of such α-olefins are propene, 1-butene, isobutene, 1-propene, 1-hexene, 1-heptene, 1-octene, 1-nonene, 1-decene, 1-undecene, 1-dodecene, butadiene, styrene, α-methylstyrene, vinyl toluenes, monofluoroethylene, 1,1- and 1,2-difluoroethylene, trifluoroethylene, tetrafluoroethylene, monochlorotrifluoroethylene, 1,1-dichloro-2,2-difluoroethylene, 3-fluoropropene, 3,3-difluoropropene and 3,3,3-trifluoro-propene.

The α-olefins B) serve as replacement for part of the ethylene A), in order to modify the properties of the resulting polymer.

Suitable components C) are preferably those acrylates or methacrylates, in which the ester radical consists of linear or preferably branched-chain $C_6$–$C_{18}$ alkyl, or $C_6$–$C_{12}$ cycloalkyl, or $C_7$–$C_{14}$ aralkyl, in particular phenylalkyl, where the said ester radicals may also carry halide atoms such as chlorine, bromine or, very particularly, flourine. Examples of compounds C) are methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, n-pentyl (meth)acrylate, neopentyl (meth)acrylate acrylate, n-hexyl (meth)acrylate, n-heptyl (meth)acrylate, n-octyl (meth)acrylate, 2-ethylhexyl (meth)acrylate, n-nonyl (metg) acrylate, isononyl (meth)acrylate, n-decyl (meth)acrylate, n-dodecyl (meth)-acrylate, isotridecyl meth)acrylate, n-tetradecyl (meth)acrylate, n-hexadecyl (meth)acrylate, n-octadecyl (meth)acrylate, n-eicosyl (meth)acrylate, cyclopentyl (meth)acrylate, cyclohexyl (meth)-acrylate, 2-, 3- and 4-methylcyclohexyl (meth)acrylates, 2,3-, 2,4-, 2,5-, 2,6-, 3,4- and 3,5-dimethylcyclohexyl (meth)acrylates, cycloheptyl (meth)acrylate, cyclooctyl (meth)acrylate, cyclohexylmethyl (meth)acrylate, 2-(cyclohexyl)ethyl (meth)acrylate, 3-(cyclohexyl)propyl (meth)acrylate, 4-(cyclohexyl)butyl (meth)acrylate, 6-(cyclohexyl)hexyl (meth)acrylate, 8-(cyclohexyl)octyl (meth)acrylate, 12-(cyclohexyl)dodecyl (meth)acrylate, benzyl (meth)acrylate, 2-phenylethyl (meth)

acrylate, 3-phenylpropyl (meth)acrylate, 4-phenylbutyl (meth)acrylate, 6-phenylhexyl (meth)acrylate, 8-phenyloctyl (meth)acrylate, 12-phenyldodecyl (meth) acrylate, 2-, 3-, and 4-methylbenzyl (meth)acrylates, mono-, di-, and tri-fluoromethyl (meth)acrylates, and also mono di-, tri-, and tetra-fluoroethyl (meth)acrylates.

Preferred components D) are acrylic acid alone or mixtures of acrylic acid and methacrylic acid having a content of from 50 to 100 wt % of acrylic acid.

The component E) serves to further modify the properties of the resulting polymer. As comonomer E) there may be used for example vinyl esters such as vinyl acetate or vinyl propionate.

Preferred quantity ranges for the monomer components A) to E) used, in each case based on the total amount of the monomer mixture, are the following:

A) from 50 to 75 wt %, in particular from 55 to 70 wt %
B) from 0 to 8 wt %, in particular from 0 to 5 wt %
C) from 10 to 25 wt %, in particular from 13 to 22 wt %
D) from 15 to 25 wt %, in particular from 17 to 23 wt %
E) from 0 to 5 wt %, in particular from 0 to 3 wt %.

In a preferred embodiment there are used polymers of

A) from 50 to 75 wt % of ethylene,
B) from 0 to 8 wt % of other α-olefins containing 2 to 9 C atoms which may also carry halide atoms,
C) from 10 to 25 wt % of one or more acrylates or methacrylates, in which the ester radical consists of $C_6$–$C_{18}$ alkyl, $C_6$–$C_{12}$ cycloalkyl or $C_7$–$C_{14}$ aralkyl, where the said ester radicals may also carry halide atoms,
D) from 15 to 25 wt % of acrylic acid and/or methacrylic acid and
E) from 0 to 5 wt % of other copolymerizable monomer for coating or sealing panes of laminated safety glass.

The polymers described are known in the art. They can be synthesized by all commonly used polymerization methods, those preferred being emulsion polymerization and in particular high-pressure polymerization at temperatures of from 150° to 300° C. and pressures of from 1200 to 3000 bar.

In order to improve the adjustment of the properties of the polymers used in the invention, for example to avoid problems relating to tackiness, it is possible to use mixtures of the polymers of the monomers A) to E) and also mixtures of these polymers with other ethylene copolymers, eg, poly (ethylene-co-(meth)acrylic acid)s.

Panes of laminated safety glass are widely used in many commercial applications; for example they are used in the construction of homes and other buildings. A preferred field of application is, however, the construction of vehicles. Thus panes of laminated safety glass designed for vehicles are found, eg, in motorcars, trucks, buses, building site vehicles such as excavators and bulldozers, agricultural vehicles such as tractors, or in railroad vehicles such as passenger carriages and locomotives.

When the polymers described are used as coating medium for panes of laminated safety glass, in particular panes of laminated safety glass designed for vehicles, this should primarily be taken to mean the use thereof as a coating medium situated between two such panes. However, the scope of the present invention includes coatings on the outer surfaces of panes of laminated safety glass, in particular panes of laminated safety glass for vehicles, for example to make them dirt-repellant or non-marring.

Another possible use is the edge-sealing of panes of laminated safety glass, in particular panes of laminated safety glass for vehicles. This particularly relates to edge-sealing of the upper edge of lowerable motorcar side windows, which—as mentioned above—can only be effected in colorless-transparent fashion.

The polymers described may be applied to the panes of laminated safety glass by any of the usual techniques, for example by dusting on a powder or laying on a foil or film and subsequently melting. In a preferred embodiment they are applied however in form of an aqueous emulsion having a solids content of from 5 to 40 wt %, in particular from 10 to 35 wt %, in which from 10 to 100%, in particular from 40 to 100% of the carboxyl groups are neutralized by ammonia ($NH_3$) or low molecular weight amines. Suitable low molecular weight amines are primarily primary, secondary, and tertiary amines having from 1 to 25, in particular from 2 to 12 C atoms. These amines may also carry hydroxyl groups or have ether oxygen functions. Furthermore, these amines may carry carboxylate groupings in the molecule, particular interesting representatives being amino group-containing unsaturated carboxylates, eg, aminoalkyl (meth) acrylates. Examples of such amines are methylamine, dimethylamine, trimethylamine, ethylamine, diethylamine, triethylamine, n-butylamine, di(n-butyl)amine, tri(n-butyl) amine, piperidine, morpholine, ethanolamine, diethanolamine, triethanolamine, monoethyl ethanolamine, dimethy ethanolamine, isopropanolamine, di(isopropanol) amine, tri(isopropanol)-amine and (2-aminoethyl) acrylate. The said amines are effective to advantage during the solidifying phase of the polymer on the glass and influence the properties of the resulting layer of plastics material.

Preferably the aforementioned aqueous emulsions are free from emulsifier, since the polymers used in the invention are usually self-emulsifying, in particular when the content of component D) is 15 wt % or above. The said aqueous emulsions are advantageously prepared by emulsification under pressure using the usual methods.

To improve the adhesion of the said aqueous emulsions on the surfaces or edges of the panes of laminated safety glass, these may be previously treated with conventional adhesion-promoting agents such as primers.

Thus another object of the present invention is to provide a method of coating or sealing panes of laminated safety glass, in particular panes of laminated safety glass for vehicles, characterized in that the said aqueous emulsions are applied to the laminated safety glass and dried, drying being effected by usual methods.

Since the aqueous emulsions described are themselves novel, they also constitute an object of the present invention.

The present invention also relates to the panes of laminated safety glass coated or sealed in accordance with the invention.

The coatings prepared on panes of laminated safety glass using the polymers of the invention are mechanically, thermally, and chemically highly stable. In particular, the panes of laminated safety glass produced in this manner become turbid due to the influence of moisture or injurious substances from the air either virtually not at all or only very slowly, even when there is insufficient or no edge-sealing. Thus when using the polymers described, it is usually possible to do without the edge-sealing normally used hitherto.

The polymers described, furthermore, constitute the ideal edge-sealing composition for panes of laminated safety glass, particularly for motorcar side windows which are provided, internally, with less stable conventional coating media such as polyvinylbutyral films, since they guarantee hermetic sealing, remain colorless-transparent for a virtually unlimited period of time, and, as sealing composition, cannot be detected by the naked eye.

EXAMPLE 1
Coating Sandwiched Between Panes of Laminated Safety Glass

An aqueous emulsifier-free emulsion of a terpolymer of 60 wt % of ethylene, 20 wt % of 2-ethylhexyl acrylate and 20 wt % of acrylic acid having a solids content of 21 wt % and a content of dimethy ethanolamine corresponding to a degree of neutralization of the carboxyl groups of 60%, was applied between two layers of silicate glass and dried. The resulting, non-edge-sealed pane of laminated safety glass was subjected to usual weather conditions together with an analogous non-edge-sealed pane in which the inside layer comprised a film of polyvinylbutyral. At the time when the pane having the internal coating of polyisobutyral film had become distinctly turbid, the pane containing the coating of the invention was still completely colorless-transparent.

EXAMPLE 2
Edge Sealing of Panes of Laminated Safety Glass

A pane of laminated safety glass which could be suitable for use as a motorcar side window, was edge-sealed with the aqueous emulsifier-free emulsion of Example 1 in that the emulsion was applied to the edge surface and dried. There was obtained an invisible, colorless-transparent seal which showed no change under usual weather conditions.

I claim:

1. A method of sealing laminated safety glass, comprising: applying a polymer prepared by copolymerizing:
    A) from 30–90 wt. % of ethylene,
    B) from 0–10 wt. % of another α-olefin of up to 12 carbon atoms, which optionally comprises halogen atoms,
    C) from 3–40 wt. % of at least one acrylate or methacrylate in which the ester radical consists of $C_1$–$C_{20}$ alkyl, $C_5$–$C_{18}$ cycloalkyl or $C_7$–$C_{18}$ aralkyl, wherein said ester radical optionally comprises halogen atoms,
    D) from 7–30 wt. % of acrylic acid, methacrylic acid or combinations thereof, and
    E) from 0–10 wt. % of another copolynerizable monomer, onto the edges of said laminated safety glass thereby sealing the safety glass panes.

2. A method of sealing laminated safety glass, comprising: applying a polymer prepared by copolymerizing:
    A) from 50–75 wt. % of ethylene,
    B) from 0–8 wt. % of another α-olefin of up to 12 carbon atoms, which optionally comprises halogen atoms,
    C) from 10–25 wt. % of at least one acrylate or methacrylate in which the ester radical consists of $C_1$–$C_{20}$ alkyl, $C_5$–$C_{18}$ cycloalkyl or $C_7$–$C_{18}$ aralkyl, wherein said ester radical optionally comprises halogen atoms,
    D) from 15–25 wt. % of acrylic acid, methacrylic acid or combinations thereof, and
    E) from 0–5 wt. % of another copolymerizable monomer, onto the edges of said laminated safety glass thereby sealing the safety glass panes.

3. A method of sealing laminated safety glass, comprising: applying an aqueous emulsion of a polymer prepared by polymerizing:
    A) from 30–90 wt. % of ethylene,
    B) from 0–10 wt. % of another α-olefin of up to 12 carbon atoms, which optionally comprises halogen atoms,
    C) from 3–40 wt. % of at least one acrylate or methacrylate in which the ester radical consists of $C_1$–$C_{20}$ alkyl, $C_5$–$C_{18}$ cycloalkyl or $C_7$–$C_{18}$ aralkyl, wherein said ester radical optionally comprises halogen atoms,
    D) from 7–30 wt. % of acrylic acid, methacrylic acid or combinations thereof, and
    E) from 0–10 wt. % of another copolymerizable monomer, having a solids content of from 5–40 wt. %, wherein from 10–100% of the carboxyl groups of the polymer are neutralized by ammonia or low molecular weight amines, about the edge of the safety glass thereby sealing the panes of safety glass.

4. A method of scaling laminated safety glass, comprising: applying an aqueous emulsion of a polymer prepared by polymerizing:
    A) from 50–75 wt. % of ethylene,
    B) from 0–8 wt. % of another α-olefin of up to 12 carbon atoms, which optionally comprises halogen atoms,
    C) from 10–25 wt. % of at least one acrylate or methacrylate in which the ester radical consists of $C_1$–$C_{20}$ alkyl, $C_5$–$C_{18}$ cycloalkyl or $C_7$–$C_{18}$ aralkyl, wherein said ester radical optionally comprises halogen atoms,
    D) from 15–25 wt. % of acrylic acid, methacrylic acid or combinations thereof, and
    E) from 0–5 wt. % of another copolymerizable monomer, having a solids content of from 5–40 wt. %, wherein from 10–100% of the carboxyl groups of the polymer are neutralized by ammonia or low molecular weight amines, about the edge of the safety glass thereby sealing the panes of safety glass.

5. A pane of laminated safety glass whose edge is sealed by the method of claim 1.

6. A pane of laminated safety glass whose edge is sealed by the method of claim 2.

7. The method of claim 1, wherein the edge sealed safety glass produced is employed in vehicles.

8. The method of claim 2, wherein the edge sealed safety glass produced is employed in vehicles.

* * * * *